United States Patent [19]
Humphrey

[11] Patent Number: 5,987,233
[45] Date of Patent: *Nov. 16, 1999

[54] COMPREHENSIVE GLOBAL INFORMATION NETWORK BROADCASTING SYSTEM AND IMPLEMENTATION THEREOF

[75] Inventor: Douglas Edward Humphrey, Laurel, Md.

[73] Assignee: SkyCache Inc., Laurel, Md.

[ * ] Notice: This patent issued on a continued prosecution application filed under 37 CFR 1.53(d), and is subject to the twenty year patent term provisions of 35 U.S.C. 154(a)(2).

[21] Appl. No.: 09/039,710

[22] Filed: Mar. 16, 1998

[51] Int. Cl.⁶ .................................................... G06F 13/00
[52] U.S. Cl. ....................................................... 395/200.47
[58] Field of Search ................... 364/DIG. 1, DIG. 2; 395/200.3, 200.32, 200.33, 200.47, 200.48, 200.49, 200.54; 711/118, 119, 121, 122, 126

[56] References Cited

U.S. PATENT DOCUMENTS

| | | | |
|---|---|---|---|
| 5,007,017 | 4/1991 | Kobayashi | 364/900 |
| 5,347,632 | 9/1994 | Filepp et al. | 395/200 |
| 5,442,771 | 8/1995 | Filepp | 395/200.49 |
| 5,548,724 | 8/1996 | Akizawa et al. | 395/650 |
| 5,583,997 | 12/1996 | Hart | 395/200.15 |
| 5,588,060 | 12/1996 | Aziz | 380/30 |
| 5,592,626 | 1/1997 | Papadimitriou et al. | 395/200.09 |
| 5,619,654 | 4/1997 | Mukai et al. | 395/200.09 |
| 5,633,933 | 5/1997 | Aziz | 380/30 |
| 5,644,714 | 7/1997 | Kikinis | 395/200.03 |
| 5,649,103 | 7/1997 | Datta et al. | 395/200.03 |
| 5,657,450 | 8/1997 | Rao et al. | 395/610 |
| 5,727,129 | 3/1998 | Barrett et al. | 706/10 |
| 5,781,909 | 7/1998 | Logan et al. | 707/200 |

*Primary Examiner*—Robert B. Harrell
*Attorney, Agent, or Firm*—Hunton & Williams

[57] ABSTRACT

The comprehensive global information network broadcasting system and implementation thereof is designed to be used to provide a plurality of, what is commonly referred to as internet service providers with updated information through the use of high speed satellite links directly to the local internet service provider from a centralized location. The satellite broadcasting system is combined with servers known as caching or proxy servers located at the client site which serve to store web and other data until the end user needs to access the data and a master cache center which coordinates the selection and transmission of information to those client sites via the satellite broadcasting system. The caching of data objects as close to the end user as possible will require less data to transit the backbones networks. The client site cache communicates to the master cache center via a connection to the internet and the client site cache receives from the master cache center via the satellite broadcasting system and, in some cases, the internet connection.

17 Claims, 3 Drawing Sheets

COMPREHENSIVE GLOBAL INFORMATION NETWORK BROADCASTING SYSTEM AND IMPLEMENTATION THEREOF

BACKGROUND OF THE INVENTION

This invention pertains to global information networks, currently referred to as internet or internet systems, and in particular, to such a system for providing a comprehensive global information network broadcasting system and the methods of implementing the same using satellite links to overcome the limitations inherent in current distribution and caching systems.

The explosion of the use of internet and other similar systems has created a series of problems that have become very difficult to overcome. A definition of this technology would include any IP network or internet, public or private, or any group of computers connected together and which includes the current system referred to as the internet. The problems are caused by the architecture of the system. The amount of raw data that is flowing on the internet is growing at a rate which cannot be sustained. One of the main problems is an increase in the number of times that the network is being called upon to move the exact same data sets to multiple users. The use of caches to reduce the number of identical items which are being passed through the internet has been implemented with some success in the past, but it is hampered by the fact that the ideal location for caches, at the edge of the network infrastructure as close as possible to the end users of the caches, presents the largest communications and coordination challenges. Caching at the end of the network, using many small caches at the network edges rather than a few large central caches at the center of the network, is complicated by the fact that the small caches then have a limited cache community size meaning that there are few users using any one cache, and so it is not able mathematically to achieve a high hit rate that is expressed in terms of the number of hits encountered in the use of the cache per 100 requests for information, because of the dependence of the hit rate upon the number of users of the cache, or members of the cache community.

The infrastructure of the current point to point system is restricted to the level of general broadcasting that can be accomplished. As the internet was established, the vast majority of all network traffic was point to point in nature. Currently, the broadcast data on the network has taken over in terms of volume of traffic, but the network continues to have a point to point architecture which is physically unable to do broadcast and will never be able to do real broadcast. The result is that the internet is choking itself with replicated data, moving thousands of copies of the same data around at any given moment in time. The major difference now and when the network originated is the size of the transmission lines which are able to move more data, only it is using the same basic architecture as was found in the original system. Another factor is that most of the data on the internet never gets accessed. Only a very small proportion of the overall material is getting a great majority of the inquiries or "hits" on the system.

There have been a number of attempts to improve the system. Acquiring larger and faster pieces or equipment or storing information in larger local caches is one way of approaching the problem. This can provide a faster response time, at least in the short term. The availability of larger and larger disc storage units have helped in this regard. Also, a number of United States Patents describe attempts to improve speed and storage capacity of interactive networks through a number of different methods—those patents include U.S. Pat. No. 5,442,771 issued to Robert Filepp et al for a "Method For Storing Data In A Interactive Computer Network" and the Patent issued to Ashar Aziz, U.S. Pat. No. 5,588,060 for a "Method and Apparatus For A Key Management Scheme For Internet Protocols".

What is necessary to achieve real improvement in the system is a caching system which will improve the ability of the cache system to obtain high rates of being accessed. This can be accomplished by a combination of system designs that measure the number of access requests for information or data that were not available on the local caches that are known as "misses". The system then examines the miss data from some or all of the local sites and determine which pieces are of sufficient interest to the internet community. The second piece necessary to improve the operation of the internet is the broadcast system which takes the information or data that has been determined to be of sufficient interest and broadcast that information and data to all the local cache systems. This action will relieve the network of a vast amount of replicated data and information which will open up the entire internet system.

It should be noted that while two basic capabilities are being used here, caching systems and satellite one-way broadcast, the two methods, when used as described herein, solve each others most serious and pressing problems allowing the two to blend into a single unique solution to the problems described herein. For the problem of multiple identical data elements traversing the internet, caching represents a good solution but because of the issue of small cache community sizes not providing high hit rates, caching is limited in its application. Satellite one-way broadcasting addresses this problem by, when combined with the data evaluation and selection that is described in use in herein, solves this problem by aggregating cache community elements from all clients into one single cache community and thus allowing high hit rates to be achieved. The use of satellite communications to provide a true broadcast mechanism in the internet is addressed by satellite communications which allows a single signal to be sent up to a satellite and the resulting signal to be sent down to large geographic areas, such that only a few satellites can achieve nearly global coverage of the planet earth, but the fact that all users must want to use the broadcast information at exactly the same time in the entire geographic area limits its functionality, but the nature of caches, such that they accept information and then store it for a time so that it can be used at times other than the exact time that it is broadcast, so that users do not need to be accessing it at exactly the same time, solves the major difficulty with satellite one-way broadcast.

It is the object of this invention to teach a method for combining the capabilities of satellite communications and caching servers to overcome the disadvantages of each and, at the same time, improve the levels of hit rate that can be achieved by caching servers thereby saving bandwidth and other valuable resources within the internet and other data network which can use these technologies. It is another object of this invention to construct a selection system which uses one-way satellite communications in order to build a true broadcast capability as an addition to the existing point to point internet network, and to use this broadcast capability to aggregate the cache community size, thus increasing the hit rates of caches on all caches which are connected to our network without regard to a number of members of the individual cache server cache community size.

What is needed is a complete comprehensive internet broadcasting system that will use a caching system that is positioned as close as possible to the end user while still being part of the shared infrastructure, because a cache at the end users location can only serve that end user and it is desirable and necessary for efficient and effective use that the cache server be shared by multiple users which will require less data and information to transit across the point to point network. What is also needed is a complete comprehensive internet broadcasting system which will overlay a capability on the existing internet that will allow a real broadcast so that the data or information can be transmitted once and received at all local caching systems.

Clearly, it is desirable for a system of this type to be very adaptable. At the same time, the system should be easy to install and be available to all customers and internet service providers. It is the object of this invention to teach a comprehensive global information network broadcasting system which overcomes the limitations and disadvantages, previously mentioned limitations of existing global information network delivery systems. It is also the object of this invention to teach a method of implementing a comprehensive global information network broadcasting system which overcomes the limitations and disadvantages, previously mentioned of existing global information network delivery systems.

SUMMARY OF THE INVENTION

Particularly, it is the object of this invention to teach a method for implementing a comprehensive global information network broadcasting system, for use in overcoming inherent limitations in current global information network systems including the requirement for multiple copies of the same information or data being moved around the internet to serve individual users along with the point to point nature of the infrastructure, comprising the steps of providing a master caching center for receiving information requests and sending out information and data; installing local caching systems for internet service providers and customers sites; providing a satellite broadcast linking system to the local caching system for providing nearly instantaneous information from the master caching center to the local caching systems; disseminating a program for selecting data elements for storage in the local caching systems; and distributing data and information updates for the local caching systems as predetermined by the master caching center.

It is also the object of this invention to teach a method of operating a comprehensive global information network broadcasting system, for use in overcoming inherent limitations in current global information network systems including the requirement for multiple copies of the same information or data being moved around the internet to serve individual users along with the point of point nature of the of the infrastructure, comprising the steps of receiving a request for information or data from a customer to the local cache site; determining the location of the requested information or data among a number of location sources; notifying the master cache center of the lack of success in finding the requested data or information in the local cache system; analyzing the number of requests that the master cache center has received on a particular piece of information or data; retrieving the data or information from the internet once the level of interest has been achieved; and sending the requested information or data through the satellite broadcasting system to all local cache sites once the data or information requests have reached a predetermined level.

Finally, it is the object of this invention to teach a comprehensive global information network broadcasting system, for use in overcoming inherent limitations in current global information network systems including the requirement for multiple copies of the same information or data being moved around the internet to serve individual users along with the point to point nature of the infrastructure, comprising a master caching center for receiving information requests and sending out information and data; local cache systems positioned at customer and internet service provider sites for sending out information and data requests and receiving and storing the information requested; means for connecting said master caching center with said local cache systems; and means for determining the level and interest in a particular piece of information or data and allowing the information and data to be sent from the master caching center to the local cache systems.

BRIEF DESCRIPTION OF THE INVENTION

Further objects and features of this invention will become more apparent by reference to the following description taken in conjunction with the following figures, in which.

DESCRIPTION OF THE PREFERRED EMBODIMENTS

Figure 1:
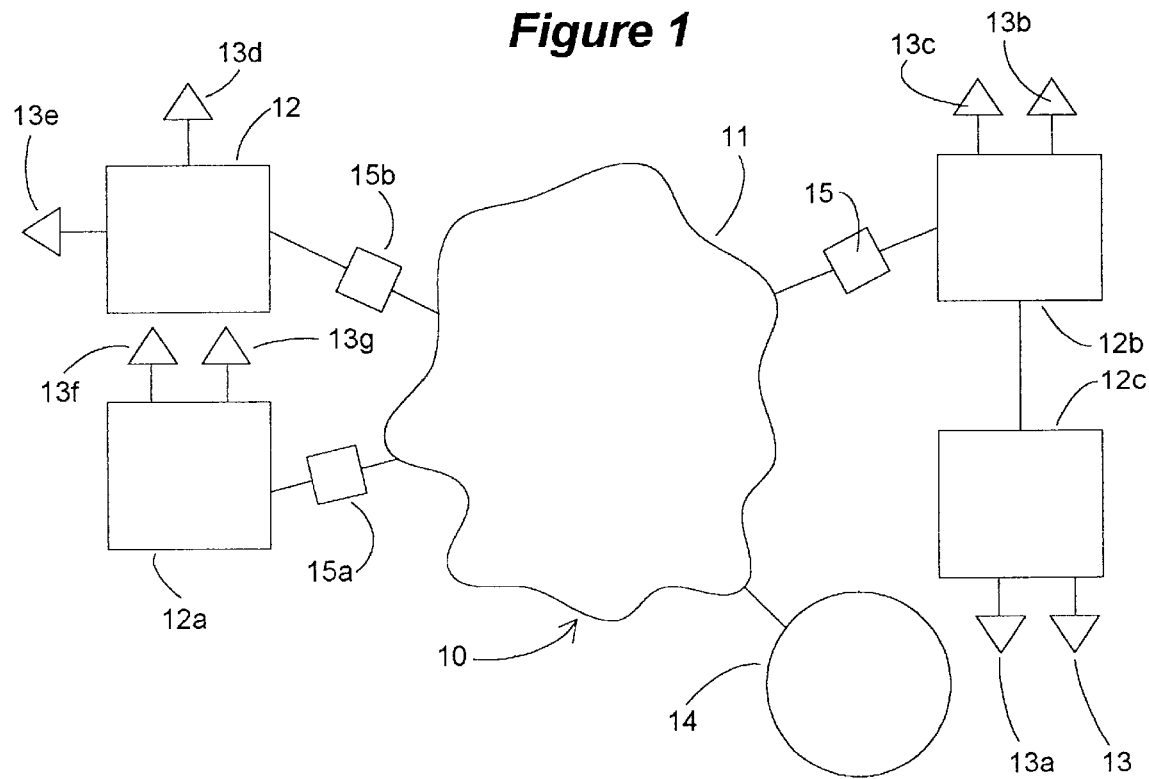
FIG. 1 is a system diagram for the current internet system.

As shown in the figures, the current internet system 10 (shown in FIG. 1) is composed of an internet highway 11 having a number of clients 12, 12a, 12b and 12c. The clients can be an internet service providers or corporate customers and each one of these customers can have a large number of their own clients shown as 13 through 13h. The amount of raw data that is flowing from the internet is growing. As information is requested from a source 14, it is sent to each and every requester over the net line 11. If caches 15 through 15b are located at positions around the net it cuts down the number of messages sent. The problem occurs when you are dealing with small systems, because caches in these system have very few (relatively) information requests. In order to work correctly, they need to have cache community size large enough to have a large hit rate. The costs associated with the equipment makes this set up prohibitive. Another difficulty of the current system is the infrastructure. Given the fact that the information has to travel over the lines, the only other way of speeding up the service, is to widen the lines or bandwidth. This solution, although feasible, has a finite limit.

Figure 2:
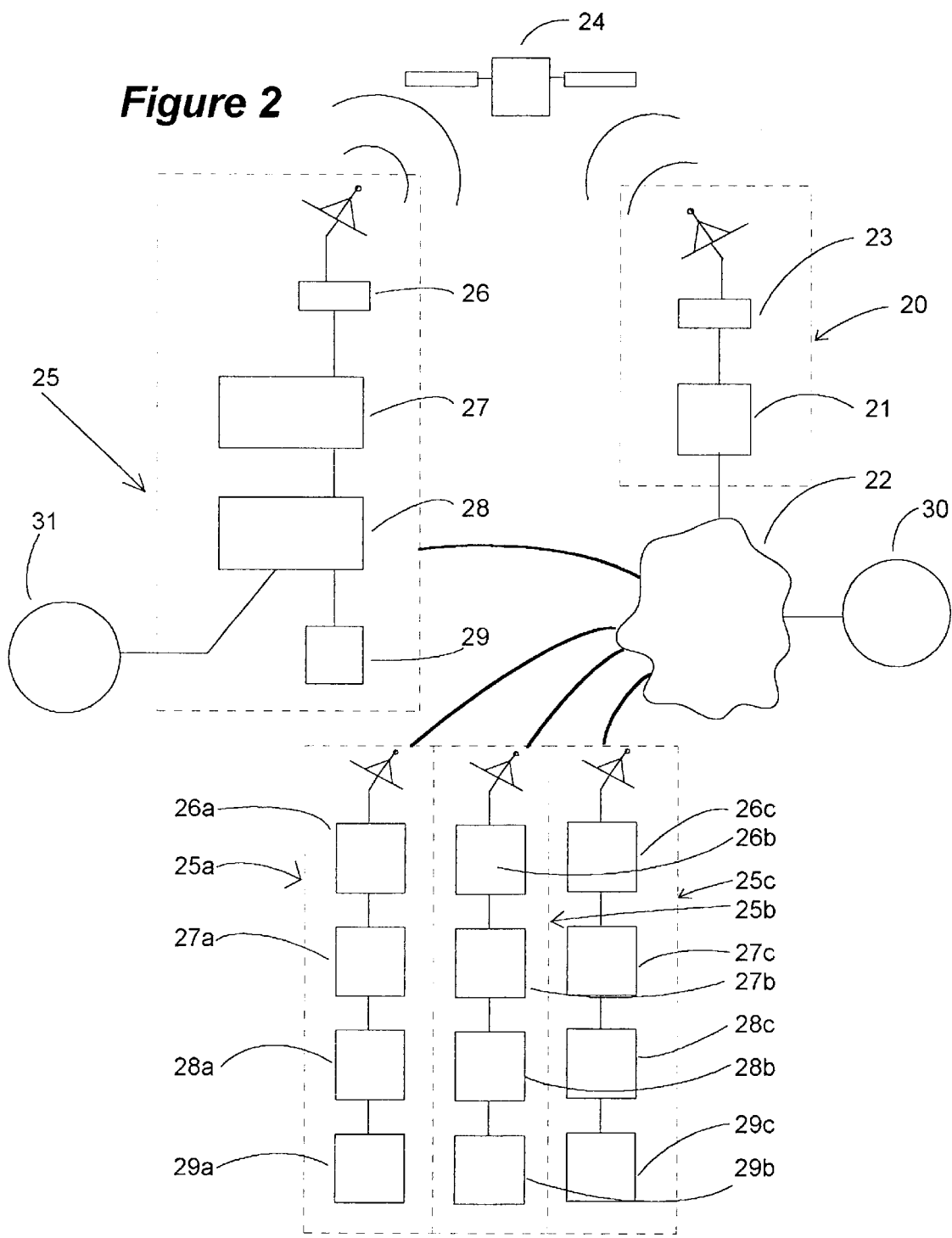
FIG. 2 is a system diagram for the novel comprehensive global information network broadcasting system.
Figure 3:
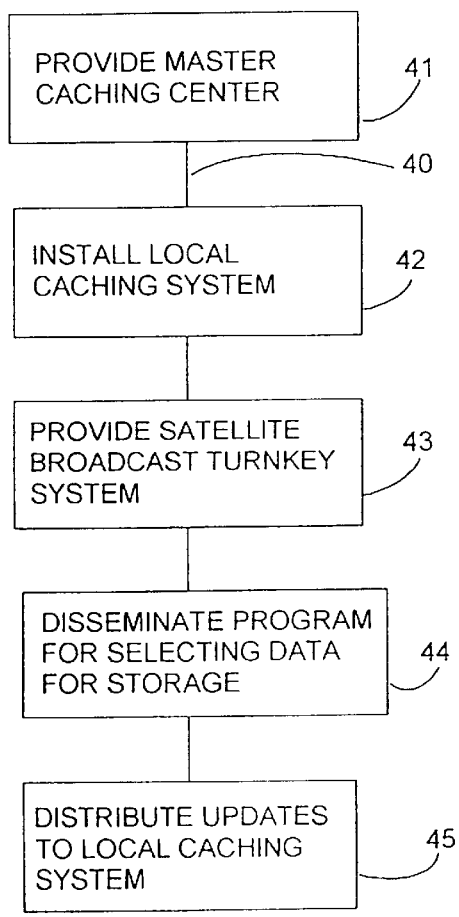
FIG. 3 is a block diagram of a method of implementing a comprehensive global information network broadcasting system.
Figure 4:
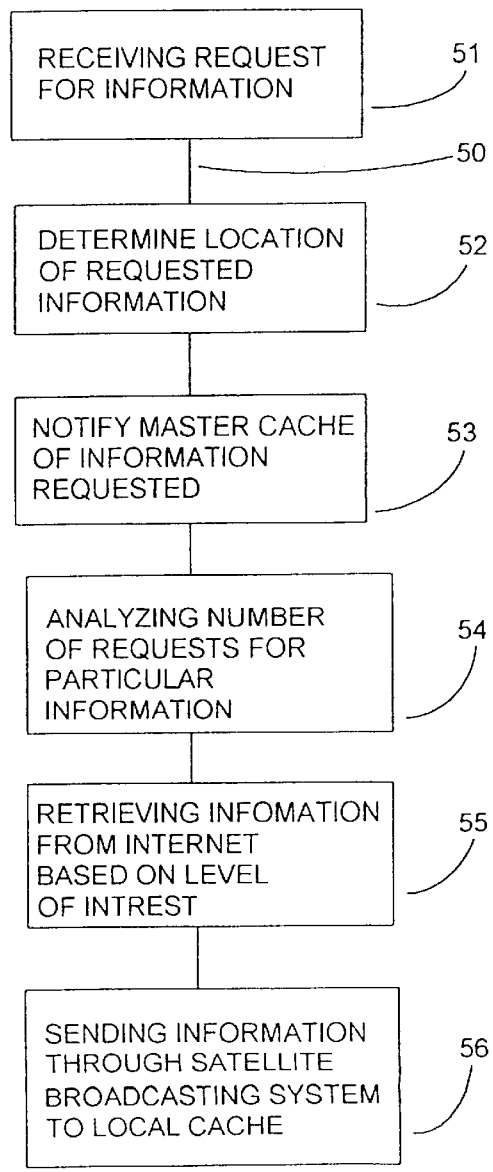
FIG. 4 is a block diagram of a method of operating a comprehensive global information network broadcasting system.

The novel complete comprehensive internet broadcasting system 20 is shown in FIG. 2. The system is comprised of a master cache center 21 that is hooked up to the internet lines 22 and a satellite uplink transmitter 23 that sends transmitted data to a geosynchronous satellite 24. Four such satellites would effectively cover the planet. The system has a plurality of clients comprising internet service providers or customers. Each of the clients has a local cache system 25 through 25c which is comprised of a satellite broadcast receiving system 26 through 26c, a cache adapter 27 through 27c and a cache 28 through 28c. The cache 28 through 28c has a cache disc 29 through 29c for the storing of information and data received from the internet or the system.

A customer 31 of the internet service provider sends a message to the local internet service provider's cache system 25 requesting information or data. The internet service provider's cache 28 checks whether it has the current version of the information or data stored on its cache. It then checks whether the information or data is located in the cache adapter 27. The cache adapter does not have the material because it does not store an information. The cache adapter 27 responds negatively to the request notifying the cache to search elsewhere. The local cache 28 then searchers other caches or the internet for the information. The cache adapter 27 sends a message over the internet to the master caching center 21 regarding the "miss" of the requested information. The master cache 21 records all the information regarding the miss and measures the amount of interest in the information or data from the local caching systems 25 through 25c. The master cache 21 has a software program that determines at what point the level of interest is sufficient to broadcast the information or data to all the internet service providers, whether or not they have requested the information.

The master cache 21 then obtains the requested information or data from a source 30 via the internet 22 and compresses the information. The master cache 21 assigns a priority to the item based upon the levels of interest and the predetermined formula in the software package. The information or data is broadcast to the satellite 24 and then is broadcast to the satellite receivers 26 through 26c of the internet service providers or customers and is handed off to the cache adapters 27 through 27c. The cache adapters 27 through 27c uses the standard protocols and requests the local cache 28 through 28c finds the item. This action causes the local cache 28 through 28c to find the item and transfers the information or data to the local cache 28 through 28c and stores it on the cache storage disc 29 through 29c.

The novel method for implementing a complete comprehensive internet broadcasting system 40 is comprised of the following steps: providing a master cache center for receiving information requests and sending out information and data 41; installing local caching systems for internet service provider and customers sites 42; providing a satellite broadcast linking system for connecting the local caching systems in order to provide instantaneous information and data from the master cache center to the local caching systems 43; disseminating a program for selecting data elements for storage in the local caching systems 44; and distributing data and information updates for the local caching systems as predetermined by the master caching center 45.

The novel method of operating a complete comprehensive internet broadcasting system 50 which uses the following steps in its process: receiving a request for information and data from a customer to the local cache site 51; determining the location by the local cache site of the requested information or data from a number of locations sources 52; notifying the master cache center of the lack of success in finding the requested data or information in the local cache 53; analyzing the number of requests that the master cache has received on a particular piece of information or data 54; retrieving the data or information from the internet 55; and sending the requested information or data through the satellite broadcasting system to all the local cache sites once the data or information requested has reached a predetermined level 56.

The above described methods and technologies improve the operation of the internet by increasing the hit rate of the local cache sites by combining them into a single cache community which can then aggregate its usage and significantly improve the hit rates to the benefit of the internet service provider or end user organization. The elements designed into the system that result in the improvements include the use of a cache adapter at each of the local cache sites. This adapter is informed when the local cache site has been asked for information or data and is also informed that the local cache site did not have the information and data. This is important because if a local cache site doesn't have the information or data, it requires the local cache sites to seek the information in the internet and then to place that information in the local cache site.

The adapter communicates the miss information with the master cache center. The master cache center analyzes the miss data from all the local cache sites and determines the information and data that are of a sufficient interest to the internet community, using the companion software program to do so. This determines the information and data that warrants having the information and data sent by means of the satellite connection and thus being placed in all of the local cache sites in the system.

Controlling the amount of information and data being sent to the local caching sites is important because of the nature of the information and data being delivered. Much, if not a majority of the information and data available would be considered archival or data which is accessed so seldomly as to make it not desirable to have cached in multiple locations. Active material are items that have a regular level of interest and is of some benefit to have some degree of local site caching. Popular material which is accessed regularly is worth caching. Intensive (frequently updated) material is of questionable value caching because it is changed so often. The key factor that is under the control of the software program is that the material being sent to all the local caching sites should provide value to the internet service providers or end user.

A number of processes can be used to improve the system. This could include having the master cache center pre-stage information or data that has been requested. This process allows the master cache server to obtain the information or data even before the evaluation has been done to determine whether it will be sent up to the satellite. This will minimize the time delay experienced once the determination has been made that the information or data meets the criteria to be transmitted to all local caching sites. The system would also use a predictive model to position large information items that do not change frequently and have regular levels of interest.

While I have described my invention in connection with specific embodiments thereof, it is clearly to be understood that this is done only by way of example and not as a limitation to the scope of my invention as set forth in the objects thereof and in the appended claims.

I claim:

1. A method for implementing a comprehensive global information network broadcasting system, for use in overcoming inherent limitations in current global information network systems including the requirement for multiple copies of the same information or data being moved around the internet to serve individual users and the point to point nature of the infrastructure, comprising the steps of:

providing a master caching center for receiving information requests and sending out information and data;

installing local caching systems for internet service providers and customer sites;

providing a satellite broadcast linking system to the local caching system for providing nearly instantaneous information from the master caching center to the caching systems;

disseminating a program for selecting data elements for storage in the local caching system; and distributing data and information updates for the local caching systems as predetermined by the master caching center.

2. A method for implementing a comprehensive global information network broadcasting system, according to claim 1, wherein:

said providing a master caching center step comprises using a caching unit for measuring all the information request misses from the local caching systems; and said providing a master caching center step further comprises the use of a software program for controlling the measurement of the number of information and data requests and determining the level of interest in a particular piece of information or data.

3. A method of implementing a comprehensive global information network broadcasting system, according to claim 2, wherein:

said use of a software program step further comprises setting the priority of the information and data to be transmitted by the satellite broadcast linking system.

4. A method of implementing a comprehensive global information network broadcasting system, according to claim 1, wherein:

said installing local caching systems step comprises positioning a receiving customer cache with the customer or internet service provider for storing a limited amount of information and data and relaying requests for information and data it does not possess to the complete comprehensive internet broadcasting system; and said installing local caching systems step further comprises providing a cache adapter to the customer or internet service provider for providing a screening mechanism for the master caching center.

5. A method of implementing a comprehensive global information network broadcasting system, according to claim 4, wherein:

providing a cache adapter step comprises installing a unit which relays information to the master caching center dealing with information and data request misses in the local caching system.

6. A method of implementing a comprehensive global information network broadcasting system, according to claim 1, wherein:

said providing a satellite broadcast linking system step comprises providing the necessary hardware to permit the master caching center to be linked to the satellite transmission system; and said providing a satellite broadcast linking system step further comprises providing the receiving hardware to be connected to the local caching system for allowing the information to be received and return information can be submitted back to the master caching center.

7. A method of implementing a comprehensive global information network broadcasting system, according to claim 1, wherein:

said disseminating a program for selecting data elements step comprises providing a software program that instructs the local caching system to search its own storage for the information or data requested, then request the information from the cache adapter and then to search other areas, such as the internet.

8. A comprehensive global information network broadcasting system, for use in overcoming inherent limitations in current global information network systems including the requirement for multiple copies of the same information or data being moved around the internet to serve individual users and the point to point nature of the infrastructure, comprising:

a master caching center for receiving information requests and sending out information and data;

local cache systems positioned at customer and internet service provider sites for sending out information and data requests and receiving and storing the information requested;

means for connecting said master caching center with said local cache systems; and means for determining the level and interest in a particular piece of information or data and allowing the information and data to be sent from the master caching center to the local cache systems.

9. A comprehensive global information network broadcasting system, according to claim 8, wherein:

local cache systems comprises a customer cache for storing information and data, requesting information and data, and sending out the received information and data; and said local cache systems further comprise a cache adapter for receiving requests from said local cache system for said information and data and notifying said master caching center of the request for information and data from said local cache system.

10. A comprehensive global information network broadcasting system, according to claim 9, wherein:

said local cache systems having a software program for directing said local cache system to search its own memory when a request for information or data is received, notify said cache adapter when the information or data requested is not in the memory of said local cache systems, and then searching the internet for the information and data requested.

11. A comprehensive global information network broadcasting system, according to claim 8, wherein:

said connecting means comprises a satellite broadcast system for allowing said master caching center to all of said local cache systems through said caching adapters at said local cache systems;

said satellite broadcast system comprises a master caching center linkage means for permitting said master caching center to said satellite broadcast system; and said satellite broadcast system further comprises a local cache system linkage means for permitting said local cache systems to be connected to said master caching center.

12. A comprehensive global information network broadcasting system, according to claim 8, wherein:

said means for determining the level of interest and allowing the data and information to be sent comprises a software program for permitting the measuring the number of inquiries from said cache adapters by the master caching center, the predetermined level at which the number of inquiries triggers the forwarding of the information and data requested from said master caching center to all of said local cache systems.

13. A method of operating a comprehensive global information network broadcasting system, for use in overcoming inherent limitations in current global information systems including the requirement for multiple copies of the same information or data being moved around the internet to serve individual users and the point to point nature of the infrastructure, comprising the steps of:

receiving a request for information or data from a customer to the local cache site;

determining the location by the local cache site of the requested information or data from a number of location sources;

notifying the master cache center of the lack of success in finding the requested data or information in the local sources;

analyzing the number of requests that the master cache has received on a particular piece of information or data;

retrieving the data or information from the internet once a predetermined level of interest has been achieved; and sending the requested information or data through the satellite broadcasting system to all the local cache sites once the data or information requests have reached a predetermined level.

14. A method of operating a comprehensive global information network broadcasting system, according to claim 13, wherein:

said determining the location of the requested data or information step comprises checking the local cache site for the information or data in an updated current format;

said determining the location of the requested data or information step further comprises checking the cache adapter; and said determining the location of the requested data or information step further comprises checking other sources, such as the internet itself, to obtain the information or data.

15. A method of operating a comprehensive global information network broadcasting system, according to claim 13, wherein:

said notifying the master caching center of the lack of success in finding the requested data or information on the local cache site step comprises having the cache adapter notify the master caching center of the request for information or data from the local caching site.

16. A method of operating a comprehensive global information network broadcasting system, according to claim 13, wherein:

said analyzing the number of requests step comprises providing the master cache center with a software program that determines the level of interest in a particular piece of information or data and obtaining that information when the level of interest in a particular piece of information or data is reaches a predetermined point.

17. A method of operating a comprehensive global information network broadcasting system, according to claim 13, wherein:

said sending the requested information or data step comprises sending the items from the master caching center to all the local cache sites through the satellite broadcasting system even to those local caching sites that did not specifically request that particular information or data.

\* \* \* \* \*